(12) United States Patent
Popa et al.

(10) Patent No.: US 12,468,809 B2
(45) Date of Patent: Nov. 11, 2025

(54) APPLYING DIFFUSION MODELS IN ADVERSARIAL PURIFICATION AND ADVERSARIAL SAMPLE GENERATION IN CYBERSECURITY

(71) Applicant: CrowdStrike, Inc., Sunnyvale, CA (US)

(72) Inventors: Cristian Viorel Popa, Bucharest (RO); Stefan-Bogdan Cocea, Bucharest (RO); Alexandru Dinu, Bucharest (RO); Paul Sumedrea, Bucharest (RO)

(73) Assignee: CrowdStrike, Inc., Sunnyvale, CA (US)

(*) Notice: Subject to any disclaimer, the term of this patent is extended or adjusted under 35 U.S.C. 154(b) by 249 days.

(21) Appl. No.: 18/132,340

(22) Filed: Apr. 7, 2023

(65) Prior Publication Data

US 2024/0338445 A1 Oct. 10, 2024

(51) Int. Cl.
*G06F 21/56* (2013.01)

(52) U.S. Cl.
CPC .......... *G06F 21/564* (2013.01); *G06F 21/568* (2013.01)

(58) Field of Classification Search
CPC ...... G06F 21/56; G06F 21/561; G06F 21/562; G06F 21/563; G06F 21/564; G06F 21/565; G06F 21/566; G06F 21/568; G06N 20/20; G06N 20/00; G06N 20/10; G06N 7/01; G06N 7/02; G06N 3/0455; G06N 3/0464;

(Continued)

(56) References Cited

U.S. PATENT DOCUMENTS 10,783,247 B1 * 9/2020 Steinfadt ............... G06F 21/564
10,846,407 B1 * 11/2020 Serebryany ............ G06N 20/00
(Continued)

FOREIGN PATENT DOCUMENTS

CA 2900312 A1 * 8/2014 ............. G06F 21/53
CN 110210226 A * 9/2019 ............ G06F 21/562
(Continued)

OTHER PUBLICATIONS

Liu, Yannan et al. "CN 110210226 A" (machine translation), published Sep. 6, 2019. (Year: 2019).*
(Continued)

*Primary Examiner* — Michael Simitoski
(74) *Attorney, Agent, or Firm* — Lee & Hayes, P.C.

(57) ABSTRACT

Methods and systems for applying a diffusion model to adversarial purification and generating adversarial samples in malware detection are disclosed. According to an example, a malware file is inputted to a diffusion model to obtain an adversarial sample by altering content of the malware file. The adversarial sample is further tested by a malware detector. In some examples, the content of an input file may be encoded prior to be processed by the diffusion model. If the malware detector can identify the adversarial sample as a malware file, the diffusion model is updated to further alter the content until the adversarial sample successfully deceives the malware detector. According to another example, an executable file is purified using a diffusion model prior to be inputted to a malware detector. The diffusion model may remove potential malware content from the executable file, thus improving the performance of the malware detector.

20 Claims, 10 Drawing Sheets

(58) Field of Classification Search
CPC ............ G06N 3/045; G06N 3/02; G06N 3/04;
G06N 3/0409; G06N 3/0418; G06N
3/042; G06N 3/043; G06N 3/044; G06N
3/047; G06N 3/0475; G06N 3/048; G06N
3/0495; G06N 3/049; G06N 3/0499

See application file for complete search history.

(56) References Cited

U.S. PATENT DOCUMENTS

| | | | |
|---|---|---|---|
| 11,210,397 B1* | 12/2021 | Sharif | G06F 21/566 |
| 11,544,575 B2* | 1/2023 | Zhang | G06F 21/565 |
| 2019/0005000 A1* | 1/2019 | Shafet | G06N 3/126 |
| 2019/0215329 A1* | 7/2019 | Levy | G06N 20/00 |
| 2020/0036750 A1* | 1/2020 | Bahnsen | H04L 63/1416 |
| 2020/0153742 A1* | 5/2020 | Lee | H04L 47/41 |
| 2020/0159924 A1* | 5/2020 | Tran | G06F 21/566 |
| 2020/0210575 A1* | 7/2020 | Huang | G06N 3/084 |
| 2022/0269949 A1* | 8/2022 | Scheideler | G06F 21/56 |
| 2023/0039382 A1* | 2/2023 | Xu | G06F 21/554 |
| 2023/0130651 A1* | 4/2023 | Bosanský | G06N 3/088 726/23 |
| 2023/0205877 A1* | 6/2023 | Ulasen | G06F 21/56 726/23 |
| 2023/0208858 A1* | 6/2023 | Mishra | H04L 63/1416 726/23 |
| 2023/0342465 A1* | 10/2023 | Sevcenko | G06F 21/565 |
| 2024/0004993 A1* | 1/2024 | Rozenberg | G06F 21/554 |
| 2024/0320354 A1* | 9/2024 | Radu | G06F 21/568 |
| 2024/0329948 A1* | 10/2024 | Yuan | G06F 8/71 |

FOREIGN PATENT DOCUMENTS

| | | | | |
|---|---|---|---|---|
| CN | 112613036 A | * | 4/2021 | ............ G06F 21/561 |
| WO | WO-2014122662 A1 | * | 8/2014 | ............. G06F 21/53 |
| WO | WO-2020168718 A1 | * | 8/2020 | ............ G06K 9/6227 |
| WO | WO-2021012220 A1 | * | 1/2021 | ............. G06F 21/56 |

OTHER PUBLICATIONS

Yan, Qiao et al. "WO 2020/168718 A1" (machine translation), published Aug. 27, 2020. (Year: 2020).*

Zhang, Fuyong et al. "WO 2021/012220 A1" (machine translaton), published Jan. 24, 2021. (Year: 2021).*

Nie, Weili, et al. "Diffusion models for adversarial purification." arXiv preprint arXiv:2205.07460 (2022). (Year: 2022).*

J. Choi, D. Shin, H. Kim, J. Seotis and J. B. Hong, "AMVG: Adaptive Malware Variant Generation Framework Using Machine Learning," 2019 IEEE 24th Pacific Rim International Symposium on Dependable Computing (PRDC), Kyoto, Japan, 2019, pp. 246-24609, doi: 10.1109/PRDC47002.2019.00055. (Year: 2019).*

Long, Chen et al. "CN 112613036 A" (machine translation), published Apr. 6, 2021. (Year: 2021).*

Z. Moti, S. Hashemi and A. Namavar, "Discovering Future Malware Variants By Generating New Malware Samples Using Generative Adversarial Network," 2019 9th International Conference on Computer and Knowledge Engineering (ICCKE), Mashhad, Iran, 2019. (Year: 2019).*

Wang, Jinyi, et al. "Guided diffusion model for adversarial purification." arXiv preprint arXiv:2205.14969 (2022). (Year: 2022).*

* cited by examiner

APPLYING DIFFUSION MODELS IN ADVERSARIAL PURIFICATION AND ADVERSARIAL SAMPLE GENERATION IN CYBERSECURITY

BACKGROUND

Diffusion models are a new era of research in the artificial intelligence space. The models function by gradually noising an input to the model and then learning how to denoise it. The models can be trained using regular samples to identify adversarial changes in the input and generate a denoised output (also referred to as purified output). The diffusion models are useful for the task of adversarial purification as the adversarial changes can be smoothed out in the input, allowing the model to extract the most important information from the input. Despite the success in domains using continuous signals such as vison and audio, adapting diffusion models to natural language processing is under explored due to the discrete nature of texts. There is no research yet for applying diffusion models in the cybersecurity space.

Malware is, for example, used by cyber attackers to disrupt computer operations, to access and to steal sensitive information stored on the computer or to perform other actions that are harmful to the computer and/or to the user of the computer. Malware may include computer viruses, worms, Trojan horses, ransomware, rootkits, keyloggers, spyware, adware, rogue security software, potentially unwanted programs (PUPs), potentially unwanted applications (PUAs), and other malicious programs. Malware may be formatted as executable files (e.g., COM or EXE files), dynamic link libraries (DLLs), scripts, macros or scripts embedded in document files, steganographic encodings within media files such as images, and/or other types of computer programs, or combinations thereof.

Malware authors or distributors ("adversaries") frequently produce new variants of malware in attempts to evade detection by malware-detection or malware-removal tools. For example, adversaries may use various obfuscation techniques to change the contents of a malware file without changing its malicious function. Consequently, it is challenging to determine if a program is malware.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be included in the first component or operation.

DETAILED DESCRIPTION

Figure 1:
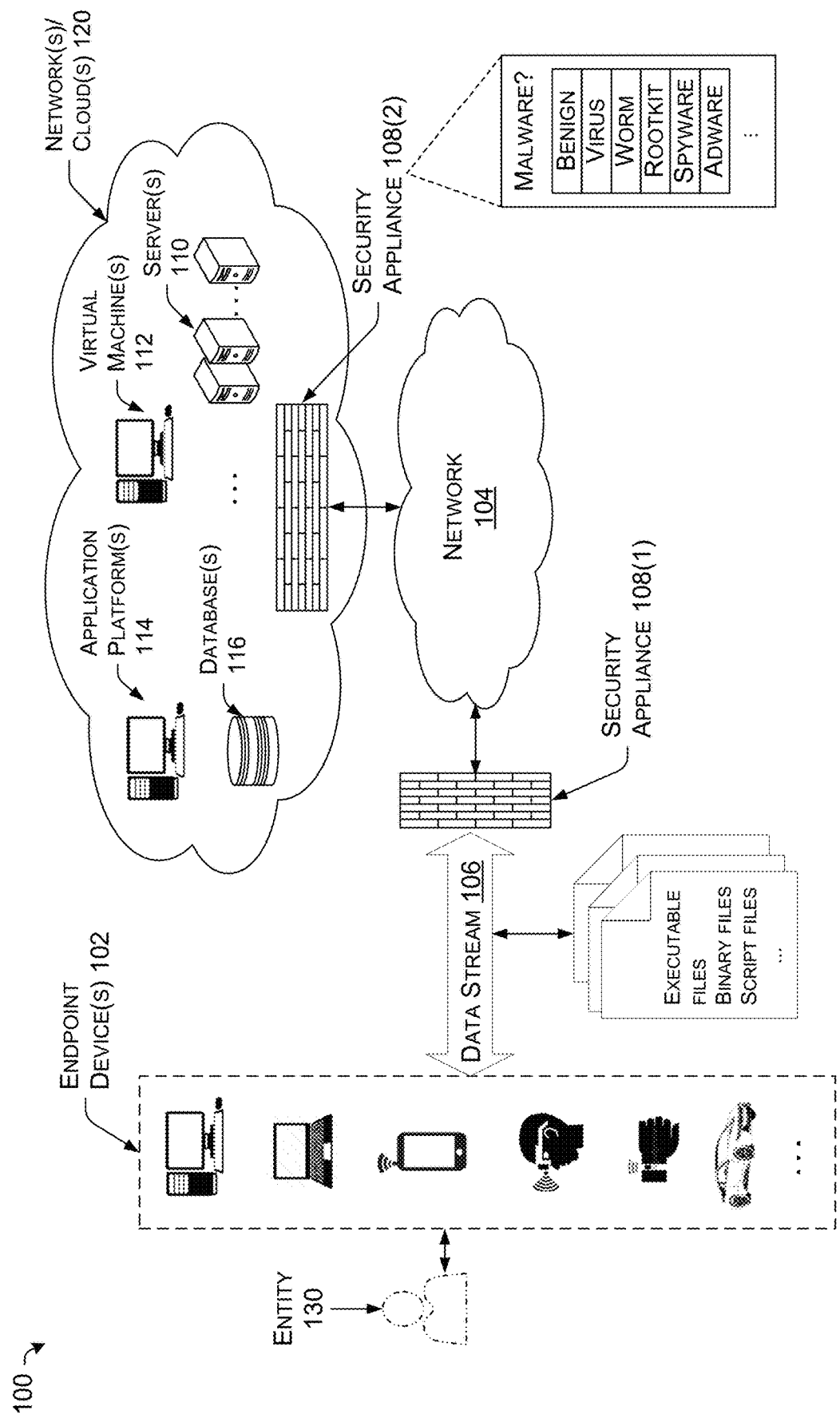
FIG. 1 illustrates an example network scenario, in which methods for applying diffusion models in cybersecurity are implemented, according to an example of the present disclosure.

Techniques for applying a diffusion model to generate adversarial samples of known malware files or to purify adversarial input to a malware detector are disclosed herein.

According to a method that applies a diffusion model to generate adversarial samples of known malware files, a known malware file may be taken as an input to a diffusion model. Content of the malware file may be altered using the diffusion model to generate an adversarial sample of the malware file. The diffusion model may gradually noise the input over a series of steps (i.e., forward process) and learn to denoise it over a series of steps (i.e., reverse process). In a circumstance that the diffusion model is applied to generate adversarial samples of the known malware file, the diffusion model may perform both the forward process and the reverse process to alter the content of the known malware file. The alteration of the content may or may not affect the functionality of the known malware file. In some examples, the known malware file may be an executable file, a binary file, a script file, etc., and the content of the malware file may include computer codes written in any programming language. The content of the malware file may also include annotations to these computer codes. The diffusion model may add and/or remove any codes and/or annotations, in some examples, without breaking its malicious functionality. In some examples, the diffusion model may remove one or more parameters that are never used when the file is executed. In some other examples, the diffusion model may remove one or more functions that are never called when the file is executed. In some examples, the known malware file may be any type of text data such as command lines, uniform resource locators (URLs), etc.

A variation of the known malware file with altered content may be tested by a malware detector (e.g., classifier). An output of the malware detector may include a confidence level that the variation is associated with a malware. As discussed herein, the present disclosure challenges the classifier using variants of known malware file. When the malware detector has difficulty to recognize the variant of a known malware file, the malware detector may output a low confidence level indicating the variant of the known malware file is less likely associated with a malware. Alternatively, when the malware detector identifies the variant of the known malware file, the malware detector may output a high confidence level indicating the variant of the known malware file is highly likely associated with a malware.

Guided by the confidence level, the method may further adjust one or more parameters of the diffusion model and re-alter the content such that the variant of the known malware file can successfully evade detection (e.g., the confidence level being lower than a threshold). The variant of the known malware file may be saved as an adversarial sample to train the malware detector in the future. The process of adjusting one or more parameters of the diffusion model may also be referred to as "penalizing the diffusion model." The value of the confidence level may determine the extent that the one or more parameters should be adjusted, i.e., the extent the diffusion model should be penalized. If the classifier outputs a high confidence level, which means that the classifier can easily identify the variant of the known malware file, the diffusion model may be penalized more. Alternatively, if the classifier outputs a low confidence level, which means that the classifier encounters challenge to identify the variant of the known malware file, the diffusion model may be penalized less.

In some examples, an auto-encoder may encode content of the known malware file in a feature space prior to inputting the content to the diffusion model. Due to the requirement of the diffusion model architecture, the auto-encoder may further perform dimensionality reduction on the feature space. In some examples, the auto-encoder may split up the content to smaller size items. Alternatively, or additionally, the auto-encoder may perform truncating and/or padding on the content such that inputs to the diffusion model are in the same size. The auto-encoder may further decode the output from the diffusion model before sending the output to the classifier.

According to another method that applies a diffusion model to purify adversarial input to a malware detector, an executable file transmitted through a computer network may be received at a security appliance. A diffusion model may be implemented prior to the malware detector in the security appliance. The diffusion model may take the executable file as an input and remove noise from it before sending the executable file to a malware detector. Comparing to the example for generating adversarial samples, the diffusion model may perform only the reverse process to denoise the executable file for adversarial purification purpose, regardless of whether the denoised executable file can function normally or not. Similar to the example for generating adversarial samples, the content of the executable file may also be pre-processed to meet the requirement of the diffusion model architecture.

As discussed herein, training a malware detector/classifier may include sophisticated operations that are normally performed offline periodically. A malware detector/classifier may not efficiently identify disguised malware files in real-time. The present disclosure implement a diffusion model prior to the classifier to purify the content of an input file, i.e., removing camouflage content from the input file, thus, assisting the classifier to instantly capture the variants of malware files. Further, by applying the diffusion model to generate the variants of known malware files and challenge the malware detector with the variants, the training data can be supplemented with useful variants of the malware files, thus, improving the malware detector training. The performance of the malware detector can be efficiently improved with the assistant of the diffusion model for adversarial purification and/or adversarial sample generation.

FIG. 1 illustrates an example network scenario, in which methods for applying diffusion models in cybersecurity are implemented, according to an example of the present disclosure.

Network scenario 100, as illustrated, may include one or more endpoint device(s) 102 that can access, through network 104, a variety of resources hosted by the network 104 and/or other network(s)/cloud(s) 120. The network scenario 100 may further include one or more security appliances such as security appliance 108(1) and 108(2) configured to provide an intrusion detection or prevention system (IDS/IPS), denial-of-service (DOS) attack protection, session monitoring, and other security services to the devices connected to the network 110 and/or other networks/cloud(s) 120.

In various examples, the endpoint device(s) 102 may be any computing devices such as a personal digital assistant (PDA), a media player, a tablet computer, a gaming device, a smart watch, a hotspot, a personal computer (PC) such as a laptop, desktop, or workstation, or any other type of computing or communication device. In some examples, the endpoint device(s) 102 may include the computing devices implemented on a vehicle such as an autonomous vehicle, a self-driving vehicle, or a traditional vehicle capable of connecting to internet. In yet other examples, the endpoint device(s) 102 may be a wearable device, wearable materials, virtual reality (VR) devices, such as a smart watch, smart glasses, clothes made of smart fabric, etc.

In various examples, the network(s)/cloud(s) 120 can be a public cloud, a private cloud, or a hybrid cloud and may host a variety of resources such as one or more server(s) 110, one or more virtual machine(s) 112, one or more application platform(s) 114, one or more database(s) 116, etc. The server(s) 110 may include the pooled and centralized server resources related to application content, storage, and/or processing power. The application platform(s) 114 may include one or more cloud environments for designing, building, deploying and managing custom business applications. The virtual desktop(s) 112 may image the operating systems and application of the physical device, e.g., the endpoint device(s) 102, and allow the users to access their desktops and applications from anywhere on any kind of endpoint devices. The database(s) 116 may include one or more of file storage, block storage or object storage. As used herein, the term "database" refers to an organized collection of data, such as a database managed by a database management system or such as some other type of datastore.

The endpoint device(s) 102 may access the resources hosted by the network(s)/cloud(s) 120. Communications between the endpoint device(s) 102 and the network(s)/cloud(s) 120 may be structural, e.g., according to defined application programming interfaces (APIs). For example, data can be retrieved via the network 104, e.g., using a Hypertext Transfer Protocol (HTTP) request such as a GET to a Web Services and/or Representational State Transfer (REST) API endpoint. Remote Procedure Call (RPC) APIs or other types of APIs can additionally or alternatively be used for network communications.

In some examples, the endpoint device(s) 102 may be operated by and/or communicated with an entity 130 (shown in phantom). The entity 130 may include systems, devices, parties such as users, and/or other features with the endpoint device(s) 102. The entity 130 may operate the endpoint device(s) 102 transmit one or more data stream(s) 106, through the network 104, to various destinations in the network(s)/cloud(s) 120. The data stream(s) 106 may include different types of data such as images, videos, documents, executable files, binary files, script files, command lines, URLs, etc. In some circumstances, the data stream(s) 106 may include files that, when executed, cause harm to the network resources.

The security appliance 108(1) or 108(2) (hereinafter security appliance 108) may store one or more computational models that are trained to detect malware attacks. A classifier, as an implementation of the computational model, may be trained to classify the files and determine whether the files contain malware. The one or more computational models may use various algorithms including but not limited to multilayer perceptrons (MLPs), neural networks (NNs), gradient-boosted NNs, deep neural networks (DNNs) (i.e., neural networks having at least one hidden layer between an input layer and an output layer), recurrent neural networks (RNNs) such as long short-term memory (LSTM) networks or Gated Recurrent Unit (GRU) networks, decision trees such as Classification and Regression Trees (CART), boosted trees or tree ensembles such as those used by the "xgboost" library, decision forests, autoencoders (e.g., denoising autoencoders such as stacked denoising autoencoders), Bayesian networks, support vector machines (SVMs), or hidden Markov models (HMMs). Additionally or alternatively, the one or more computational models may include regression models, e.g., linear or nonlinear regression using mean squared deviation (MSD) or median absolute deviation (MAD) to determine fitting error during the regression, linear least squares or ordinary least squares (OLS), fitting using generalized linear models (GLM), hierarchical regression, Bayesian regression, or nonparametric regression. In some examples, the computational model may include a set of signatures used to detect malware, e.g., antivirus signatures such as hashes or portions of a data stream, or file rules such as those used by PEiD or TrID.

The security appliance 108 may be deployed as a hardware-based appliance, a software-based appliance, or a cloud-based service. The hardware-based appliance, for example, can act as a secure gateway between the networks/cloud(s) 120 and the endpoint device(s) 102 and protect the devices/storages inside the perimeter of the networks/cloud(s) 120 from getting attacked by the malicious actors. Although illustrated as a separate component of the network(s)/cloud(s) 120, the security appliance 108(2) may also be implemented on the server(s) 110 to intercept the attacks to the cloud assets. In some other examples, the security appliance 108 may be a cloud-based service delivered to various network participants on demand and configured to track both internal network activity and third-party on-demand environment. In yet some other examples, the security appliance 108 may be software-based appliance implemented on the individual endpoint device(s) 102.

As discussed herein, a security appliance, e.g., a traditional malware detector, may use a trained classifier to detect whether a file is benign or contains malware. However, when malware adversaries use obfuscation techniques to change the contents of a malware file while keeping its function, the new variant of the malware file may escape detection. In some examples, the malware detector may re-train the classifier to learn the variants of a malware file and update the classifier for more accurate detection. In some other examples, without modifying the classifier, the malware detector may utilize a diffusion model to proactively generate a variant of a malware file and update the diffusion model under the guidance of the classifier so that the variant of the malware causes challenge to the malware detector. In yet some other examples, a file may be first inputted to the diffusion model to obtain a purified file. The purified file may then be fed into the classifier for malware detection. By applying a diffusion model ahead of the classifier, noises added to the file to obfuscate the classifier may be removed, and thus, helping the classifier identity the variant of a known malware file.

Figure 2A:
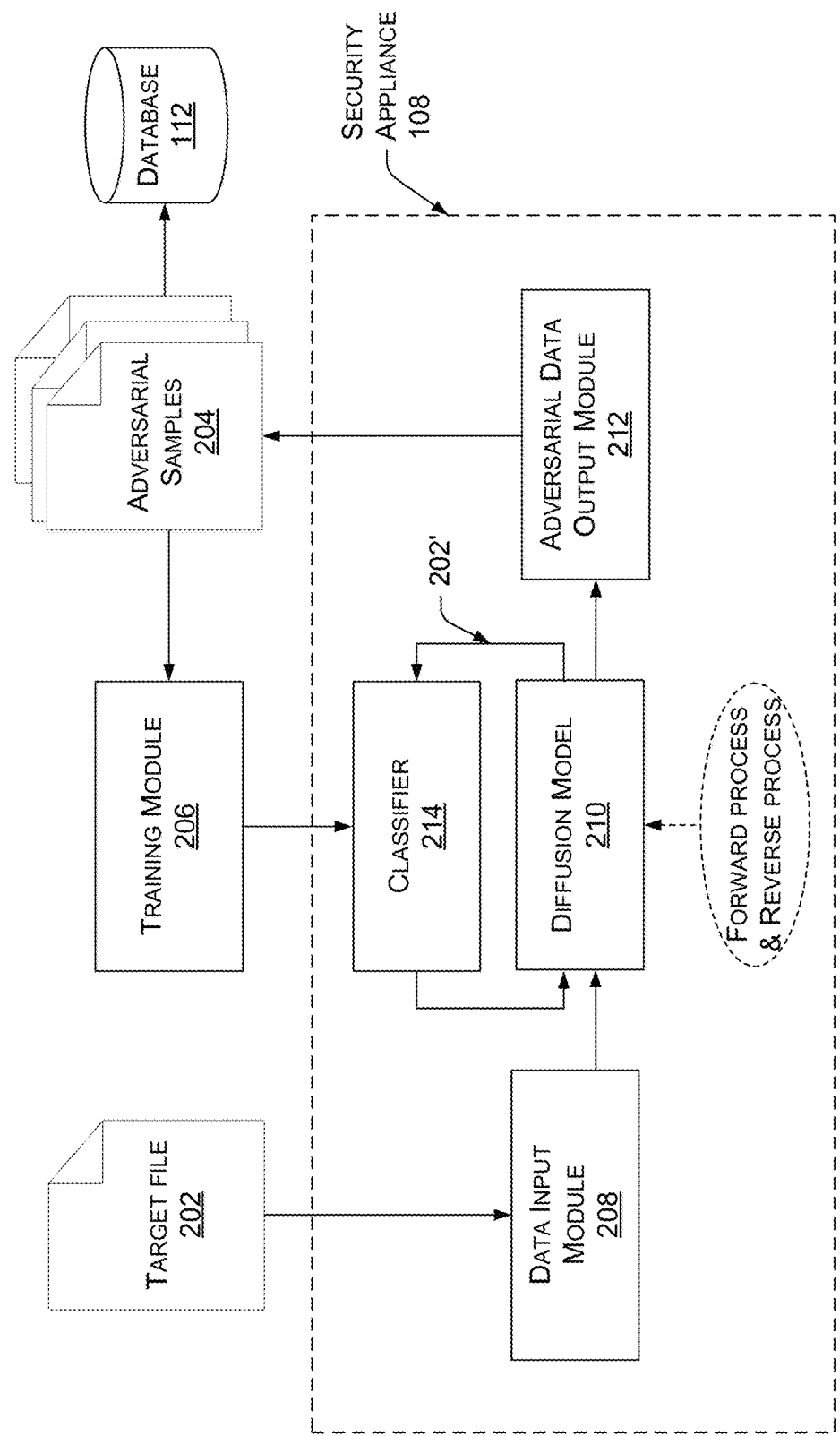
FIG. 2A-2B illustrate example diagrams of a security appliance, in which methods for applying diffusion models in adversarial sample generation, according to an example of the present disclosure.
Figure 2B:
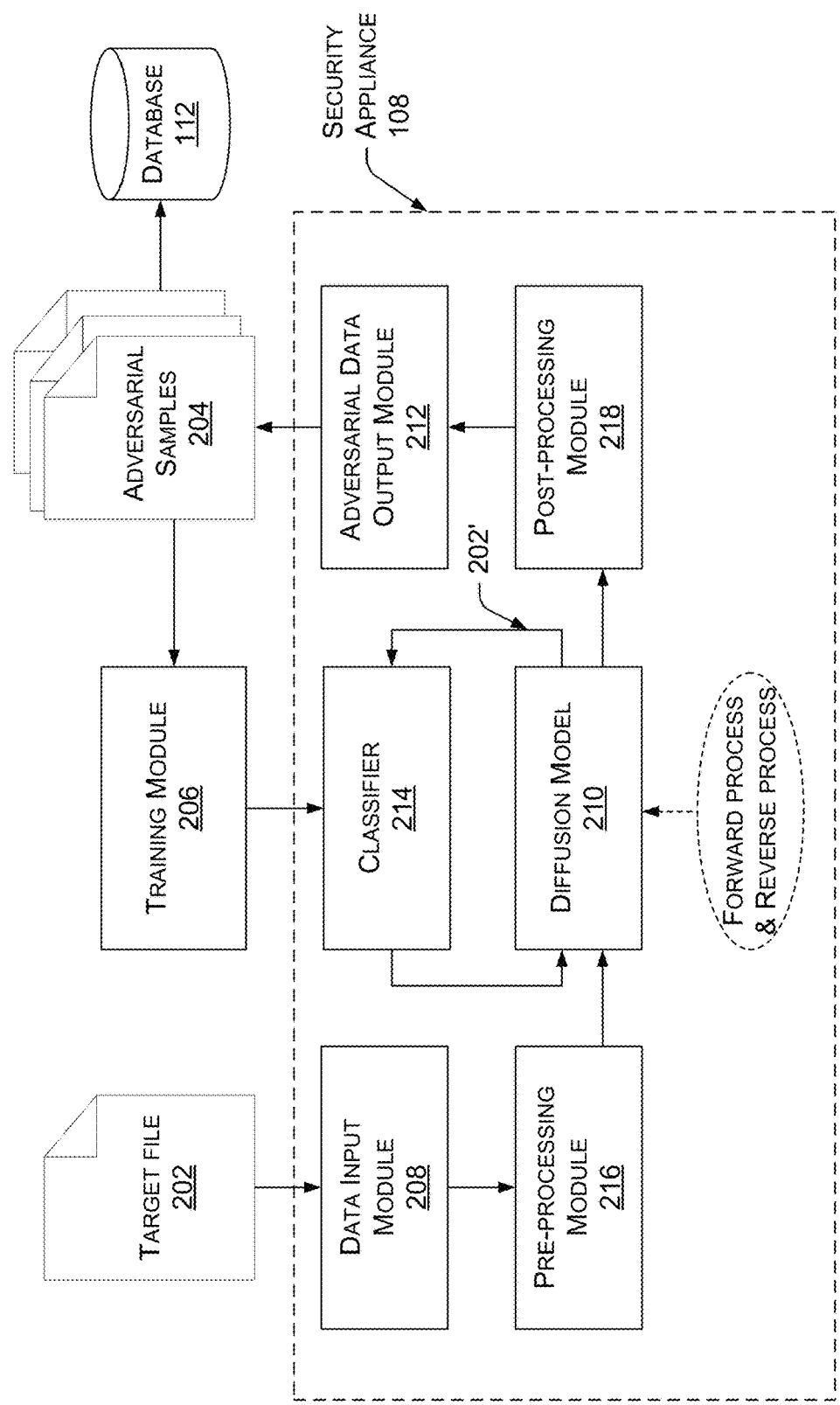

FIG. 2A-2B illustrate example diagrams of a security appliance, in which methods for applying diffusion models in cybersecurity, according to an example of the present disclosure.

As illustrated in FIG. 2A, an example diagram 200 of a security appliance may include a data input module 208, a training module 206, a diffusion model 210, a classifier 214, and an adversarial data output module 212. A target file 202, e.g., a sample malware file, may be obtained by the data input module 208. In some examples, the target file may include any type of text data such as command lines, URLs, an executable file, a binary file, a script file, etc. The data input module 208 may retrieve contents of the target file 202 and input the contents of the target file 202 to a diffusion model 210. The diffusion model 210 may alter the contents of the target file 202. In some instances, altering the contents may not break the functionality of the target file 202. In yet other instances, altering the contents may affect how the target file 202 works. The diffusion model 210 may send a variant 202' of the target file 202 with altered content to the classifier 214. Taking the variant 202' of the target file 202 as an input, the classifier 214 may generate an output that indicates a confidence level of the variant 202' of the target file 202 being associated with malware.

In implementations, the data input module 208 may use a tokenization technique to convert the content of the target file 202 into a numerical format prior to inputting it to the diffusion model 210.

The confidence level may be further used as a reference to update the diffusion model 210. For example, if the classifier 214 outputs a high confidence level, which indicates the variant 202' of the target file 202 is more likely associated with malware, the diffusion model 210 may be guided to adjust the parameters of the model to re-alter the content. The diffusion model 210 may send a new variant of the target file 202 with the re-altered content to the classifier 214 to re-evaluate the association level of the new variant of the target file 202 with malware.

The process of adjusting the parameters of the diffusion model 210 may also be referred to as "penalizing" the diffusion model. The extent that the diffusion model is penalized, e.g., the extent that the parameters are adjusted, may depend on the confidence level outputted from the classifier 214. As the purpose of the process is to challenge the classifier 214 with different variants of a known malware file, the diffusion model 210 is penalized more if the classifier 214 can easily identify an adversarial change. Alternatively, the diffusion model 210 is penalized less if the classifier 214 has difficulty to identify an adversarial change. In some examples, the diffusion model 210 may be penalized more when the classifier 214 outputs a high confidence level, while the diffusion model 210 may be penalized less when the classifier 214 outputs a low confidence level. The process of "penalizing" may repeat until a number of iterations is met and/or the classifier 214 outputs a confidence level that is below a threshold.

Once the diffusion model 210 completes updating, the latest variant of the target file 202 may be outputted to the adversarial data output module 212. The adversarial data output module 212 may detokenize the output from the diffusion model 210 to reconstruct the altered content and generate an adversarial sample 204 of the target file 202 based on the latest variant. The adversarial sample 204 may be further stored in the database(s) 116. In some examples, the diffusion model 210 may generate multiple adversarial samples 204 for the target file 202, e.g., multiple variants of the target file 202. In some examples, the adversarial samples 204 may be applied to a training module 206 to train the classifier 214 for malware detection.

In some examples, the diffusion model 210 may include any machine learning models, any types of neural networks, etc. The diffusion model 210 may be configured to perform a forward process, in which, the content of the target file 202 is gradually perturbed or noised over a series of steps. The diffusion model 210 may subsequently perform a reverse process, in which, the output from the forward process is gradually denoised over a series of steps. In some examples, during the forward process, the diffusion models 210 may gradually add additional content to the content of the target file that does not change the functionality of the target file 202. A script file, as an example of the target file 202, can contain commands to be executed sequentially or can use a more complex flow of execution. The diffusion models 210 may add one or more annotations, assign values to one or more parameters that are not used by any commands, or define one or more new functions that would not be called, etc., to the content of the target file 202. During the reverse process, the diffusion models 210 may gradually remove the content from the output of the forward process with the noising strategy adopted during the forward process.

The example diagram 200 of the security appliance may further include a pre-processing module 216 configured to perform pre-processing of the input to the diffusion model 210 and a post-processing module 218 configured to perform post-processing of the output from the diffusion model 210, as illustrated in FIG. 2B. The pre-processing module 216 may encode the input, e.g., the tokenized content of the target file 202, using an auto-encoder into a lower dimensional latent representation. In some examples, the auto-encoder may adopt a machine learning algorithm, a deep learning algorithm, or any type of neural networks. The post-processing module 218 may decode the output from the diffusion model 210 from the latent space. The implementation of the pre-processing module 216 may effectively reduce the dimensionality of the feature space of the content of the target file 202 and pre-remove certain noise from the content of the target file 202.

It should be understood that the example diagram 200 of the security appliances shown in FIG. 2A-2B are for the purpose of illustration. The security appliance may include other elements in conjunction with the elements shown in the figures to perform malware detection. In addition, the computational models, the machine learning algorithms, and the neural networks described above are also for the illustrative purpose. The elements of the security appliance such as the pre-processing module 126, the diffusion model 210, the classifier 214, the post-processing module 218, etc., may use any future variants of the existing computational models, the machine learning algorithms, and the neural networks.

Figure 3A:
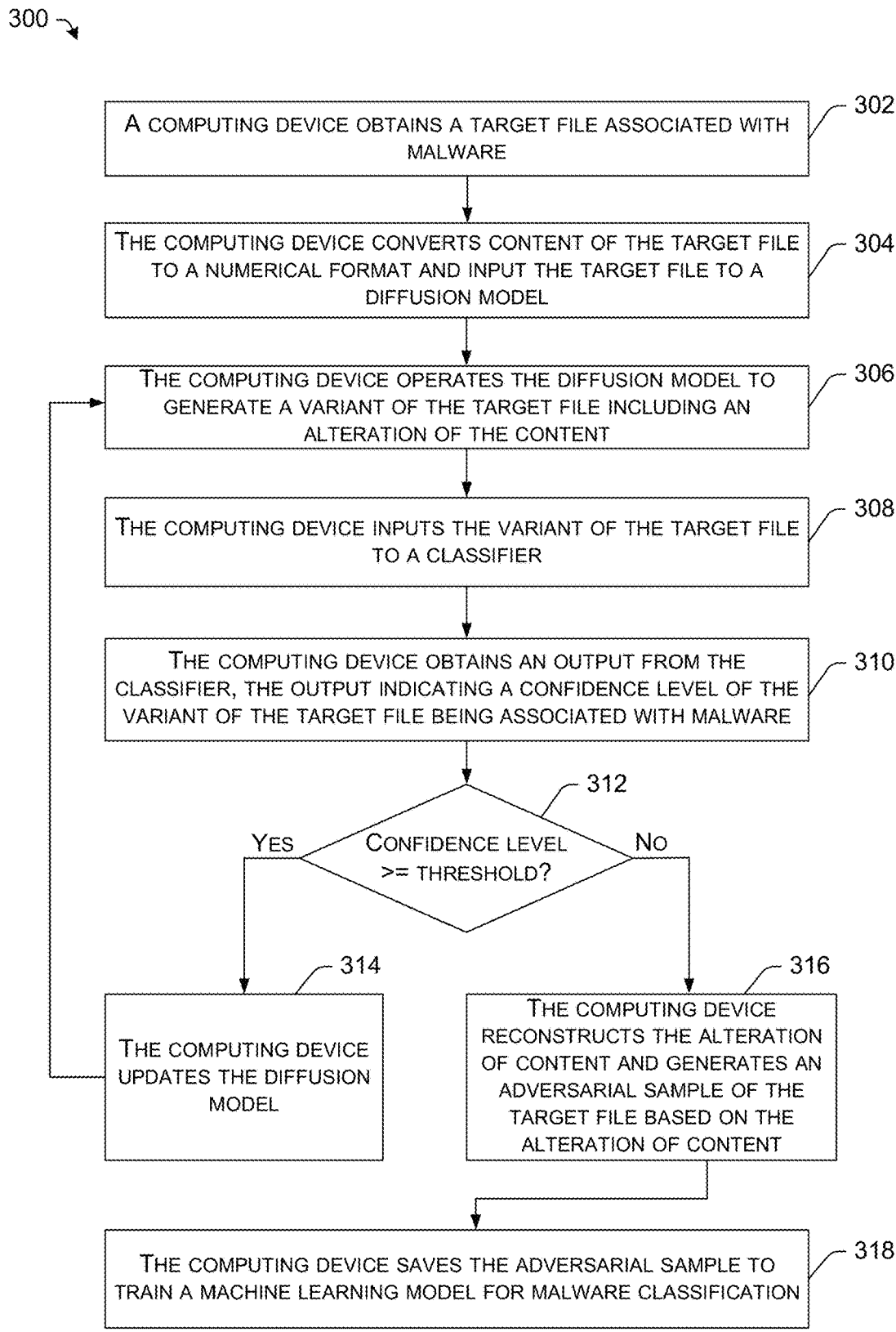
FIG. 3A-3B illustrate example processes for applying diffusion models in adversarial sample generation, according to another example of the present disclosure.
Figure 3B:
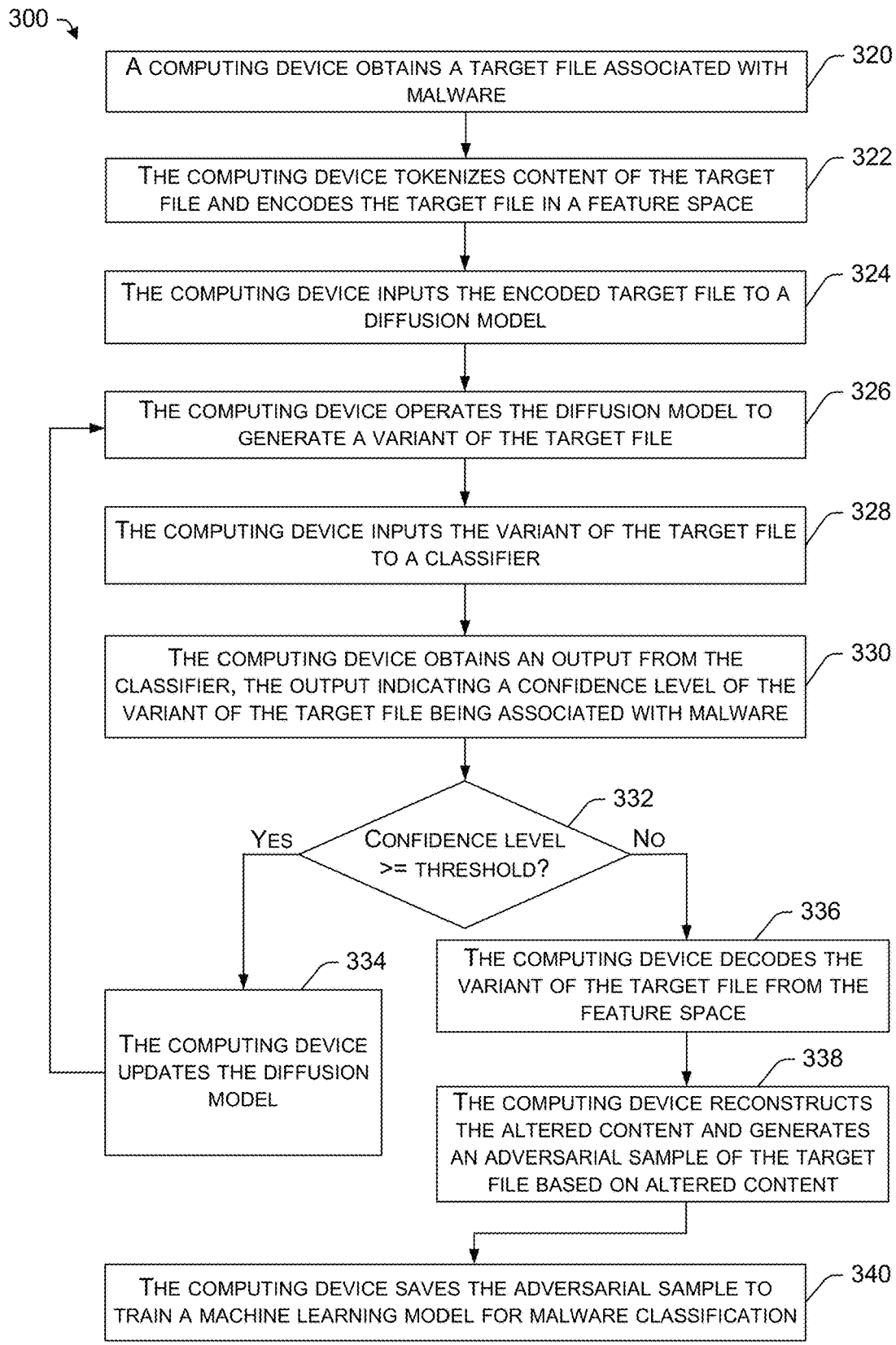

FIG. 3A-3B illustrate example processes for applying diffusion models in adversarial purification, according to another example of the present disclosure. The example process of FIG. 3A may be performed by various elements of the security appliance illustrated in FIG. 2A.

At operation 302, a computing device may obtain a target file associated with malware. The target file may be known to include some type of malware. As discussed herein, the target file may include any type of text data such as an executable file, a binary file, a script file, URLs, command lines, etc. The target file may be obtained from a database that stores the known malware files.

At operation 304, the computing device may convert content of the target file to a numerical format and input the target file to a diffusion model. In some examples, the content of the target file may include a plurality of commands, annotations, parameters, functions, etc. In some examples, the content of target file may be converted to the numerical format using any tokenization techniques. The operation 304 may be performed by the data input module 208 of FIG. 2A.

At operation 306, the computing device may operate the diffusion model to generate a variant of the target file including an alteration of the content. As discussed herein, the alteration of the content may or may not affect the functionality of the target file. In some examples, the diffusion model may perform a forward process to gradually introduce noise to the target file in a series of steps. Additionally, the diffusion model may perform a reverse process to gradually remove noise from the target file in a series of steps. In some examples, the alteration of the content may include added or deleted annotations, added or deleted parameters that are not used, added or deleted functions that are not called by the commands in the target file, etc. The operation 306 may be performed by the diffusion model 210 of FIG. 2A.

At operation 308, the computing device may input the variant of the target file to a classifier. As discussed herein, the classifier may be trained to identify malware files. The computing device may challenge the classifier with the variant of a known malware content. The operation 308 may be performed by the classifier 214 of FIG. 2A.

At operation 310, the computing device may obtain an output from the classifier, the output indicating a confidence level of the variant of the target file being associated with malware. As discussed herein, the alteration of the content may disguise the target file as a benign file. The classifier may determine how likely the variant of the target file is associated with malware. When the variant of the target file is determined to be very likely associated with malware, the classifier may output a high confidence level. When the variant of the target file is determined to be less likely associated with malware, the classifier may output a low confidence level.

At operation 312, the computing device may determine whether the confidence level is equal to or greater than a threshold.

When the confidence level is less than the threshold, which indicates that the variant of the target file successfully deceives the classifier, the computing device may reconstruct the alteration of content and generate an adversarial sample of the target file based on the alteration of the content, at operation 316.

At operation 318, the computing device may use the adversarial sample to train a machine learning model for malware classification. The operation 318 may be performed by the training module 206 of FIG. 2A.

When the confidence level is equal to or greater than the threshold, which indicates that the variant of the target file has not deceived the classifier, the computing device may update the diffusion model at operation 314. The confidence level outputted by the classifier may be used as a reference to update the diffusion model. As discussed herein, one or more parameters of the diffusion model may be adjusted to some extent based at least in part on the confidence level. When the confidence level is high, which indicates the variant of the target file can be easily identified by the classifier, the one or more parameters of the diffusion model may be adjusted more (i.e., the diffusion model is penalized more). When the confidence level is relatively low, which indicates the variant of the target file causes challenge to the classifier, the one or more parameters of the diffusion model may be adjusted less (i.e., the diffusion model is penalized less).

The computing device may operate the updated diffusion model to repeat the operation 306 to modify the alteration of the content. The computing device may further test the classifier using a new variant of the target file including the modified alteration of the content at operations 308 and 310. In some examples, the iteration of updating the diffusion model may complete when the confidence level outputted from the classifier is less the threshold or a number of iterations meets a criteria.

The example process 300 for applying diffusion models in adversarial purification may also include operations related to data pre-processing and post-processing. FIG. 3B illustrates an example process 300 with data pre-processing and post-processing, which may be performed by various elements of the security appliance illustrated in FIG. 2B.

Similar to operation 302 of FIG. 3A, a computing device may obtain a target file associated with malware at operation 320.

At operation 322, the computing device may tokenize content of the target file and encode the target file in a feature space. In some examples, the encoding of the content may include dimensionality reduction on the feature space. In some other examples, the encoding of the content may include splitting up the content of the target file to accommodate the size limitation of the diffusion model. In yet some other examples, the encoding of the content may include truncating and padding the datasets so that all datasets have the same size, required by the diffusion model.

The computing device may perform subsequent operations similar to those illustrated in FIG. 3A. For example, at operation 324, the computing device may input the encoded target file to a diffusion model, at operation 326, the computing device may operate the diffusion model to generate a variant of the target file, at operation 328, the computing device may input the variant of the target file to a classifier, at operation 330, the computing device may obtain an output from the classifier, the output indicating a confidence level of the variant of the target file being associated with malware, and at operation 332, the computing device may determine whether the confidence level is equal to or greater than a threshold. When the confidence level is equal to or greater than a threshold, the computing device may similarly repeat the operations 326, 328, 330, and 332 until the confidence level is less than the threshold or a number of iterations meets a criteria.

When the confidence level is less than the threshold, the computing device may decode the variant of the target file from the feature space at operation 336. In some examples, the feature space may include a latent feature space or an embedding feature space. At operation 338, the computing device may reconstruct the altered content and generate an adversarial sample of the target file based on the altered content. The computing device may use the adversarial sample to train the machine learning model for malware classification at operation 340.

Figure 4A:
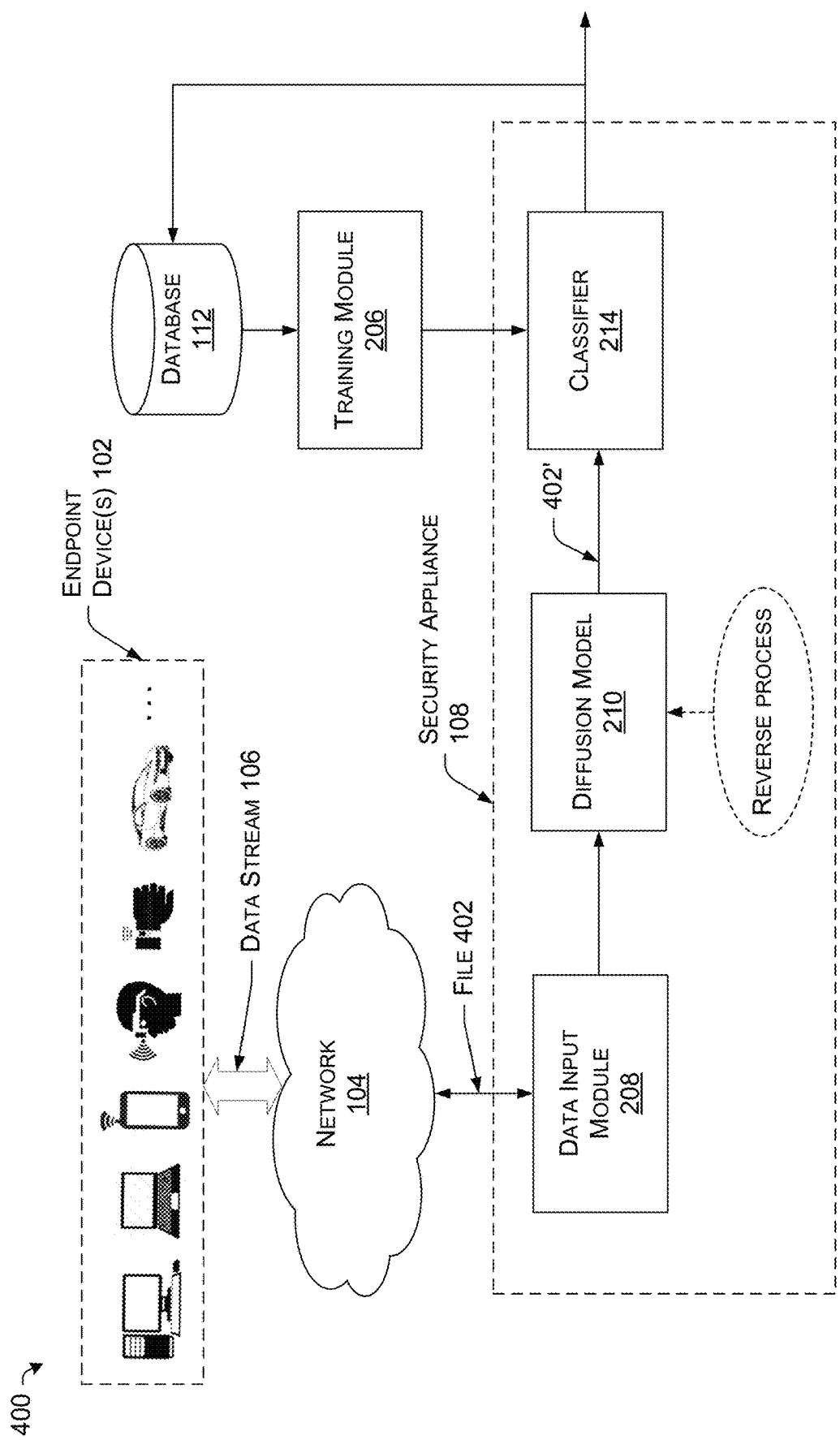
FIG. 4A-4B illustrate example diagrams of a security appliance, in which methods for applying diffusion models in adversarial purification, according to an example of the present disclosure.
Figure 4B:
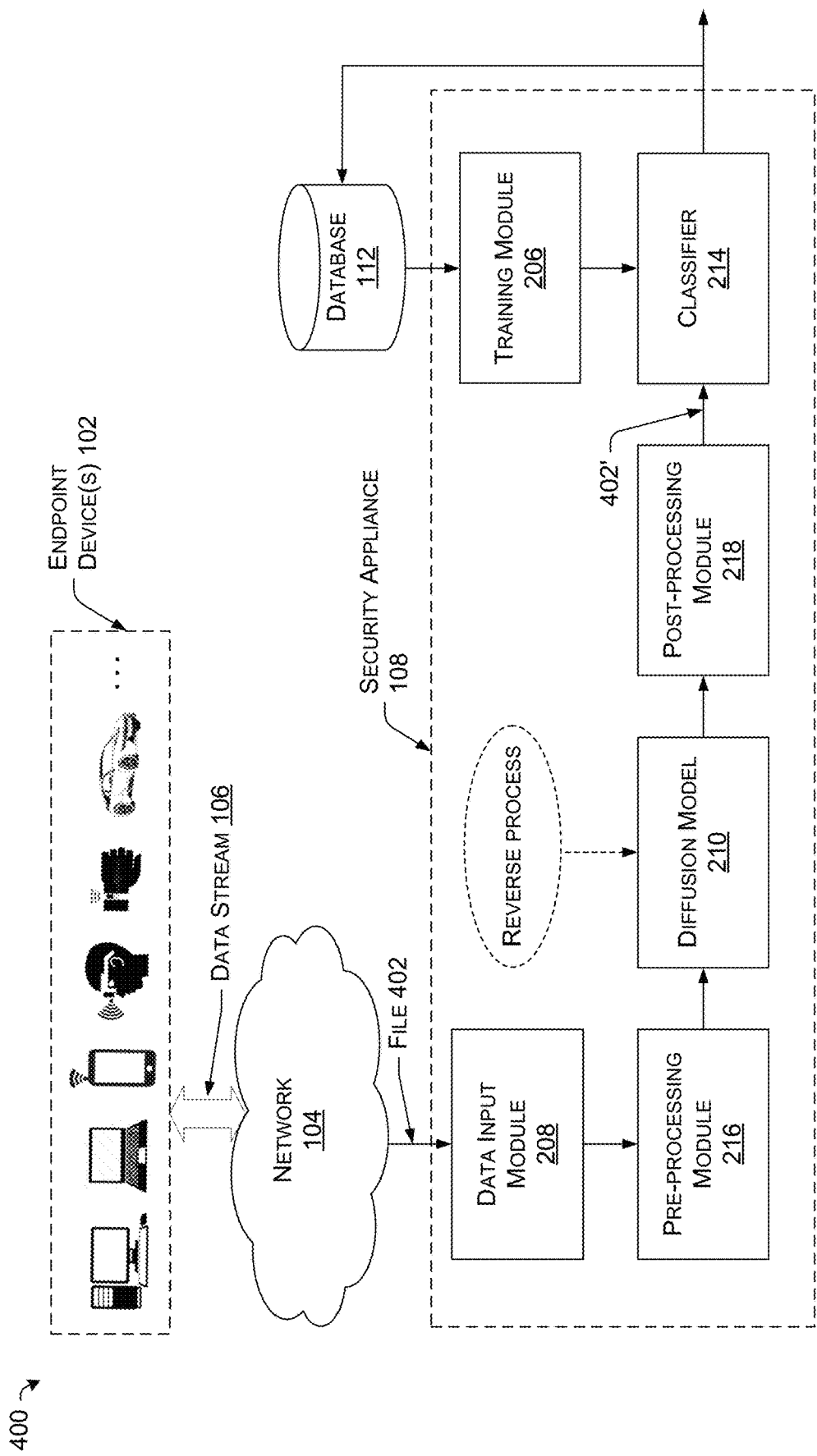

FIG. 4A-4B illustrate example diagrams of a security appliance, in which methods for applying diffusion models in adversarial purification, according to an example of the present disclosure.

As discussed herein, an aspect of the present disclosure is to apply the diffusion model for adversarial sample generation, as described above in connection with FIGS. 2A-2B and 3A-3B. The variants of known malware files may be used as adversarial samples to train the malware detector (e.g., classifier) to improve the robustness of malware detector.

Another aspect of the present disclosure is to apply the diffusion model to purify the input to remove the noise that the malware adversaries adds to obfuscate the classifier, as described below in connection with FIGS. 4A-4B and 5A-5B.

As illustrated in FIG. 4A, the example diagram 400 of a security appliance may include a data input module 208, a diffusion model 210, a training module 206, and a classifier 214. The diffusion model 210 may be disposed between the data input module 208 and the classifier 214.

In some circumstances, various data streams 106 may be transmitted from endpoint devices 102 to the network 104. A data input module 208 of the security appliance (e.g., the security appliance 108 of FIG. 1) may obtain a file 402 in the data streams 106 for malware screening. Instead of sending the file 402 to the classifier 214, the data input module 208 may send the file 402 to the diffusion model 210 to perform adversarial purification. The diffusion model 210 may perform a reverse process to gradually remove noise from the file 402 in a series of steps. As discussed herein, the denoising performed by the diffusion model 210 may or may not affect the functionality of the file 402. In some examples, the diffusion model 210 may remove some annotations from the content of the file 402. In some other examples, the diffusion mode 210 may remove some parameters that are not used in any function or command. In yet other some examples, the diffusion model 210 may remove some functions that are not called by any command. The diffusion model 210 may input the purified file 402' to the classifier 214 to determine the confidence level that the file 402 is associated with malware.

In some examples, the content of the file 402 may be transformed into a numerical format prior to be inputting to the diffusion model 210. In implementations, the content of the file 402 may be tokenized.

In some examples, the input to the diffusion model 210 may be pre-processed due to the requirement of the model architecture. FIG. 4B illustrates that the example diagram 400 of the security appliance may further include the pre-processing module 216 and the post-processing module 218. The pre-processing module 216 may perform auto-encoding of the content of the file 402 (e.g., the tokenized content), splitting of the file, truncating and padding of the content so that the input has the same size, etc. The functions of the pre-processing module 216 and the post-processing module 218 are described above in connection with FIG. 3B and are not detailed herein.

Figure 5A:
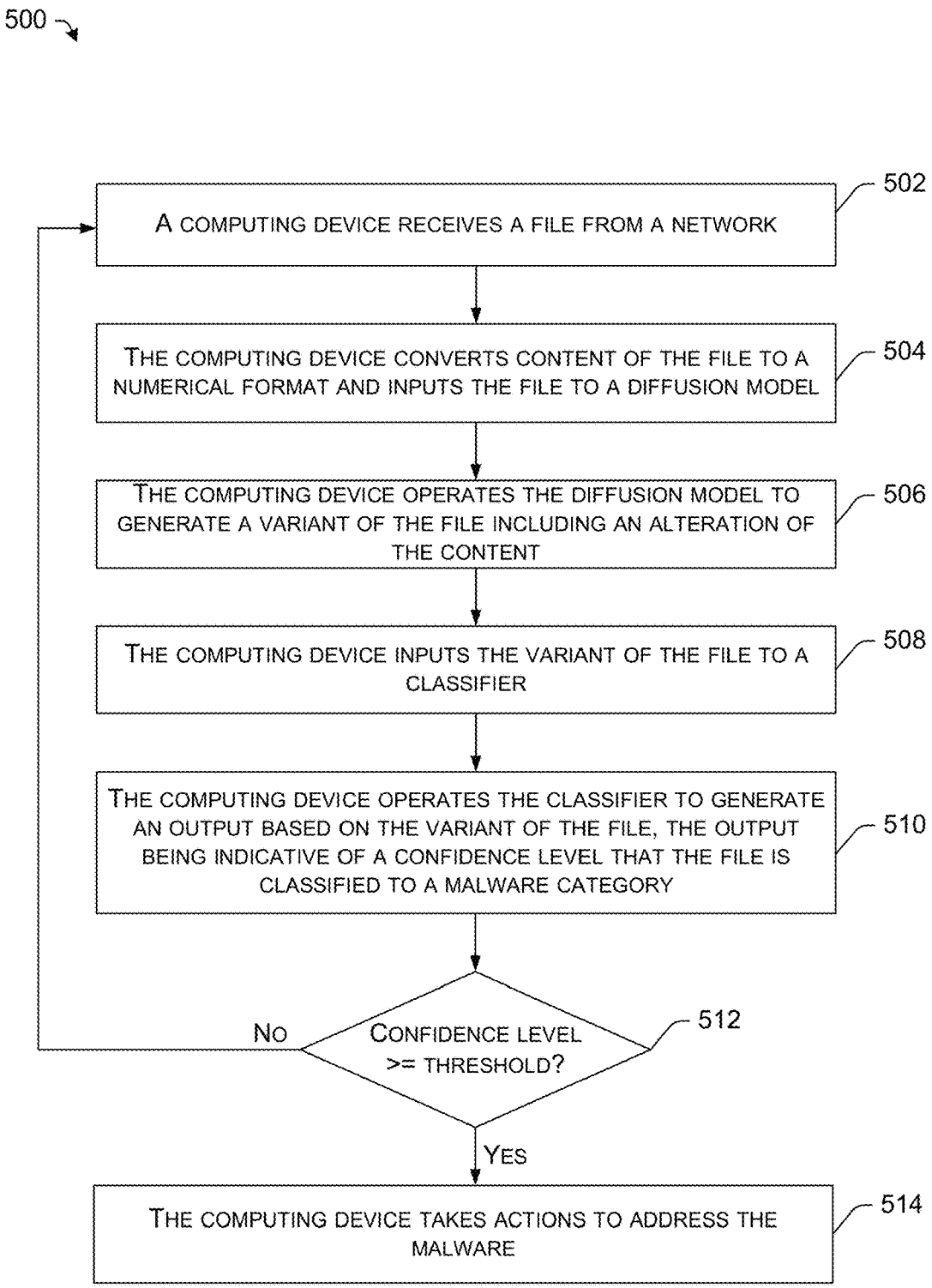
FIG. 5A-5B illustrate example processes for applying diffusion models in adversarial purification, according to another example of the present disclosure.
Figure 5B:
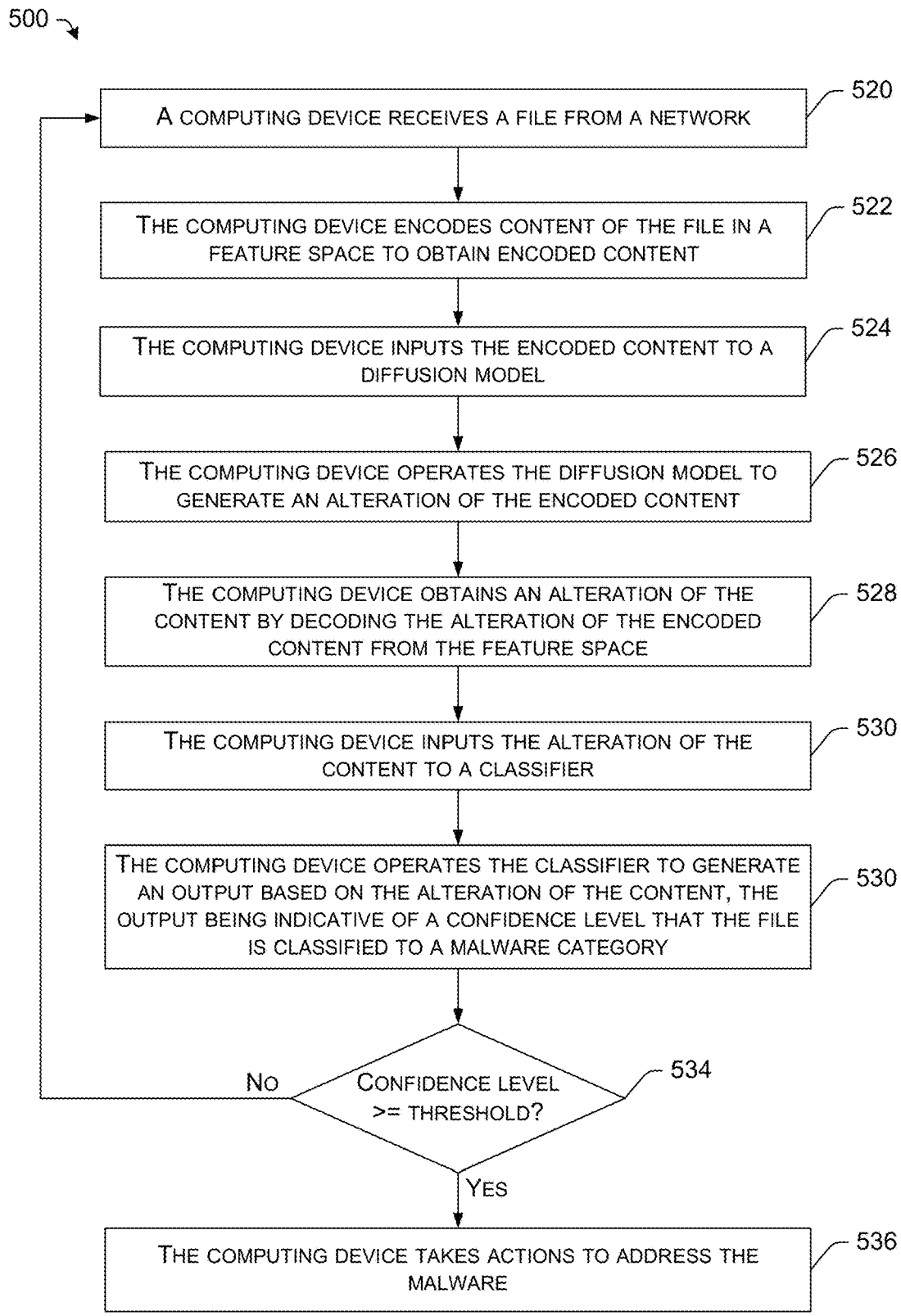

FIG. 5A-5B illustrate example processes for applying diffusion models in adversarial purification, according to another example of the present disclosure. The example process of FIG. 5A may be performed by various elements of the security appliance illustrated in FIG. 4A.

At operation 502, a computing device may receive a file from a network. In some examples, the file may be an executable file, a binary file, or a script file, generated from an endpoint device. In some examples, the endpoint device may be operated by an entity such as a user, a server having access to the endpoint device, a program run on the endpoint device, etc. The file may be benign or contain malware factors.

At operation 504, the computing device may convert content of the file to a numerical format and input the file to a diffusion model. The content of the file may be converted to the numerical format using any tokenization techniques. In some examples, the content of the file may be encoded in a feature space prior to inputting to the diffusion model. The operation 504 may be performed by the data input module 208 of FIG. 4A.

At operation 506, the computing device may operate the diffusion model to generate a variant of the file including an alteration of the content. The diffusion model may generate one or more alterations of the content by removing potential adversarial content from the content of the file. As discussed herein, for adversarial purification, the diffusion model may remove any suspicious content from the file and it is not necessary to retain the functionality of the file. The operation 506 may be performed by the diffusion model 210 of FIG. 4A.

At operation 508, the computing device may input the variant of the file to the classifier. According to the present disclosure, the input file is purified using the diffusion model to remove the noises that deceives the classifier.

At operation 510, the computing device may operate the classifier to generate an output based on the variant of the file, the output being indicative of a confidence level that the file is classified to a malware category. In some examples, the classifier may output the confidence level indicating that the file is benign or malware. In some other examples, the classifier may output the confidence level associated with a malware category that the file falls into. For example, the output of the classifier may indicate multiple confident levels associated with various malware categories such as virus, worm, rootkit, spyware, adware, etc.

At operation 512, the computing device may determine whether the confidence level is equal to or greater than a threshold. In some examples, the confidence level may be associated with a malware category. In some other examples, when the output of the classifier indicates multiple confidence levels associated with multiple malware categories, the computing device may determine whether each of the confidence levels is equal to or greater than the respective threshold. If the confidence level is less than a threshold, the computing device determines the file is benign and the operation returns to 502.

If the confidence level is equal to or greater than the threshold, at operation 514, the computing device may take actions to address the malware. When more than one confidence level meets the respective threshold, the computing device may take various actions to address each detected malware. The computing device may run an antivirus software to quarantine the endpoint device that originates the file. In some examples, the computing device may alert other elements on the network about potential attacks and/or run any antivirus software to screen the files stored thereon.

The example process 500 for adversarial purification may also include operations related to data pre-processing and post-processing. FIG. 5B illustrates an example process 500 with data pre-processing and post-processing, which may be performed by various elements of the security appliance illustrated in FIG. 4B.

Similar to operation 502 of FIG. 5A, a computing device may obtain a file from a network at operation 520.

At operation 522, the computing device may tokenize content of the file and encode the tokenized content of the file in a feature space to obtain encoded content. The encoding of the content may include dimensionality reduction on the feature space, splitting up the content of the file, truncating and padding the datasets so that all datasets have the same size, required by the diffusion model, etc.

The computing device may perform subsequent operations similar to those illustrated in FIG. 5A. For example, at operation 524, the computing device may input the encoded content to a diffusion model; at operation 526, the computing device may operate the diffusion model to generate a variant of the file including an alteration of the encoded content; at operation 528, the computing device may decode the variant of the file from the feature space; at operation 530, the computing device may input the decoded variant of the file to the classifier; at operation 532, the computing device may operate the classifier to generate an output based on the variant of the file, the output being indicative of a confident level that the file is classified to a malware category; and at operation 534, the computing device may determine whether the confidence level is equal to or greater than a threshold.

If the confidence level is less than a threshold, the computing device determines the file is benign and the operation returns to 520. If the confidence level is equal to or greater than the threshold, at operation 536, the computing device may take actions to address the malware.

As discussed herein, the diffusion model 210 applied in the adversarial sample generation, as shown in FIGS. 2A-2B and 3A-3B, may perform both forward process and reverse process on the target file.

By contrast, the diffusion model 210 applied in the adversarial sample purification, as shown in FIGS. 4A-4B and 5A-5B, may perform the reverse process only to purify the content of the file 402, e.g., removing noise from the file 402. In both the adversarial sample generation and the adversarial sample purification, it may not be necessary for the diffusion model 210 to retain the core function of a target file.

As discussed herein, to enhance the performance of malware classifier, a conventional approach uses training samples to train the machine learning models of the malware classifier. As some new variants of a known malware file may successfully evade detection, the training samples are missing these variants, causing deficiency in model training. As illustrated in FIGS. 2A-2B and 3A-3B, the present disclosure applies a diffusion model to proactively generate the adversarial samples of the known malware files, which can enrich the pool of the malware samples used to train the malware classifier.

The convention approach to train the malware classifier may involve various sophisticated steps. The training of the malware classifier is generally performed offline in a back-end server periodically and/or according to a schedule. Thus, the malware classifier operating online may not efficiently catch an up-to-date variant of some known malware file. As illustrated in FIGS. 4A-4B and 5A-5B, the present disclosure applies a diffusion model prior to the malware classifier to strip off potential adversarial content from the inputted target file. With the assistant of the diffusion model, the robustness of the malware classifier may be improved and the malware classifier may instantly identify a real-time variant of a malware file that has not yet been seen in the network.

Figure 6:
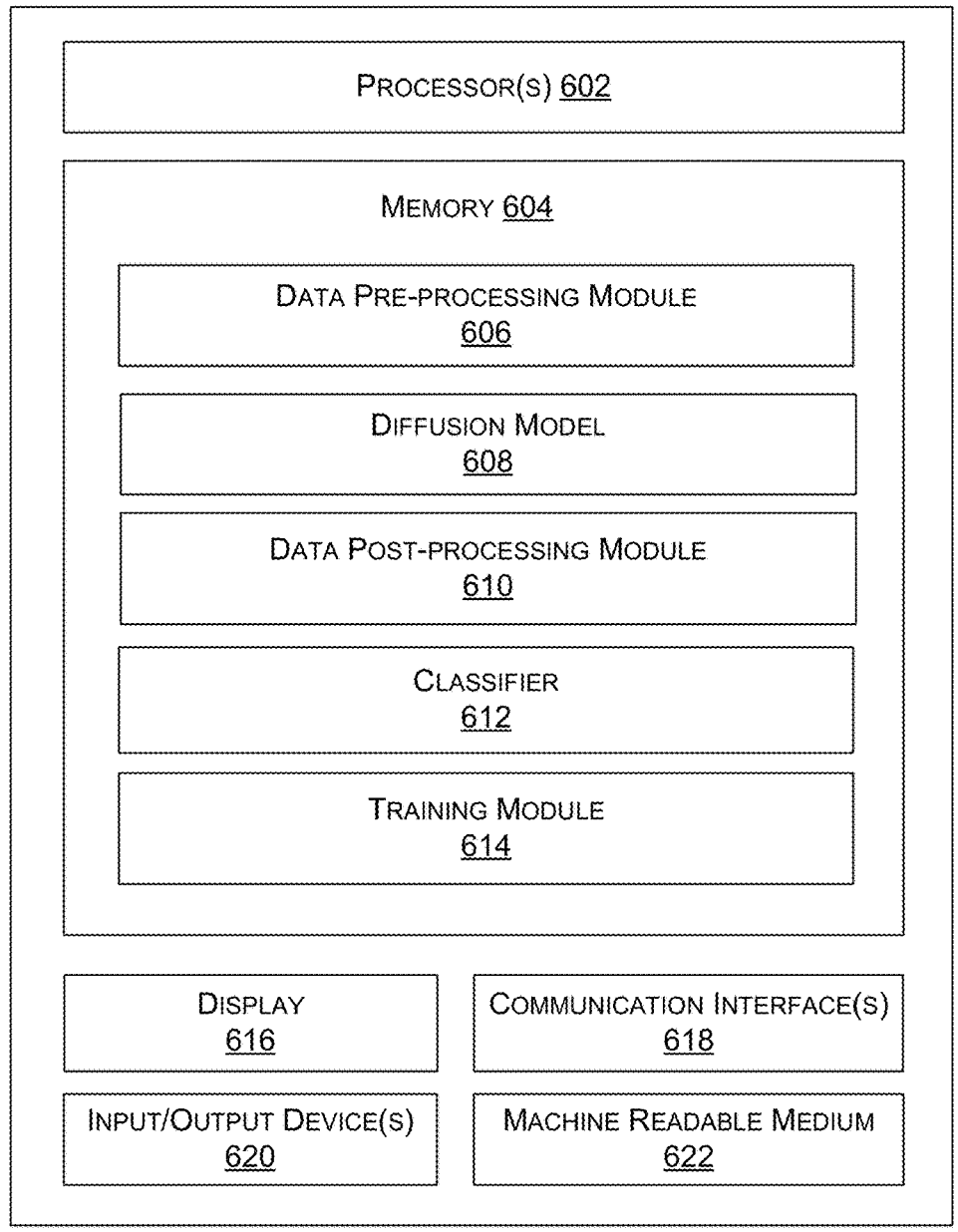
FIG. 6 illustrates an example security appliance, in which methods for applying diffusion models are implemented, according to an example of the present disclosure.

FIG. 6 illustrates an example security appliance, in which methods for applying diffusion models are implemented, according to an example of the present disclosure. The example security appliance 600 may correspond to the security appliance 108(1) and/or 108(2), as illustrated in FIG. 1.

As illustrated in FIG. 11, a security appliance 600 may comprise processor(s) 602, a memory 604 storing a data pre-processing module 606, a diffusion model 608, a data post-processing model 610, a classifier 612, and a training module 614, a display 616, communication interface(s) 618, input/output device(s) 620, and/or a machine readable medium 622.

In various examples, the processor(s) 602 can be a central processing unit (CPU), a graphics processing unit (GPU), or both CPU and GPU, or any other type of processing unit. Each of the one or more processor(s) 602 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 602 may also be responsible for executing all computer applications stored in memory 604, which can be associated with common types of volatile (RAM) and/or nonvolatile (ROM) memory.

In various examples, the memory 604 can include system memory, which may be volatile (such as RAM), non-volatile (such as ROM, flash memory, etc.) or some combination of the two. The memory 604 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the security appliance 600. Any such non-transitory computer-readable media may be part of the security appliance 600.

The data pre-processing module 606 may be configured to pre-process the input to the diffusion model 608. In some examples, the data pre-processing module 606 may encode the input in a feature space and perform dimensionality reduction on the feature space. In some examples, the data pre-processing module 606 may split up the input into smaller size content items. In yet some other examples, the data pre-processing module 606 may perform truncating and/or padding of the content items such that the content items inputted to the diffusion model 608 have the same size.

The diffusion model 608 may be configured to gradually noise the input (i.e., forward process) and the learn how to denoise it (i.e., reverse process).

In the example of adversarial sample generation, the diffusion model 608 may take a malware file as an input and alter content of the malware file. The diffusion model 608 may perform both the forward process and the reverse process to alter the content with or without breaking the functionality of the malware file. The diffusion model may send a variant of the malware file including the altered content to the classifier 612. If the variant of the malware file can be identified by the classifier 612 as a malware, one or more parameters of the diffusion model 608 may be updated to further alter the content until the classifier 612 fails to identity the variant of the malware file. The process may be also referred to penalizing the diffusion model 608. The penalizing process may be guided by the output from the classifier 612. If the output of the classifier 612 is a high confidence level that indicates the variant of the malware file is likely associated with a malware, the diffusion model 608 is penalized more, e.g., the one or more parameters may be adjusted more. If the output of the classifier 612 is a low confidence level that indicates the variant of the malware file is less likely associated with a malware, the diffusion model 608 is penalized less, e.g., the one or more parameters may be adjusted less.

In the example of adversarial purification, the diffusion model 608 may take an executable file as an input and perform only the reverse process to remove potential malware content from the executable file. As discussed herein, for the adversarial purification, it is not necessary for the diffusion model 608 to retain the functionality of the executable file.

The data post-processing model 610 may be configured to post-process the output from the diffusion model 608. In some examples, the data post-processing model 610 may decode the output from the diffusion model 608 in the latent feature space.

The classifier 612 may be trained to perform malware detection and/or classification. By supplementing adversarial samples of known malware files generated by the diffusion model 608 to the training dataset, the classifier 612 may be trained to efficiently identify variants of known malware files. In some examples, purifying the input to the classifier 612 using the diffusion model 608 may further improve the performance of the classifier 612 with no need to retrain the classifier 612.

The training module 614 may be configured to train the classifier 612 using known malware files and/or adversarial samples of the known malware files.

The communication interface(s) 618 can include transceivers, modems, interfaces, antennas, and/or other components that perform or assist in exchanging radio frequency (RF) communications with base stations of the telecommunication network, a Wi-Fi access point, and/or otherwise implement connections with one or more networks.

Display 616 can be a liquid crystal display or any other type of display commonly used in the security appliance 600. For example, display 616 may be a touch-sensitive display screen and can then also act as an input device or keypad, such as for providing a soft-key keyboard, navigation buttons, or any other type of input. Input/output device (s) 620 can include any sort of output devices known in the art, such as display 616, speakers, a vibrating mechanism, and/or a tactile feedback mechanism. Input/output device(s) 620 can also include ports for one or more peripheral devices, such as headphones, peripheral speakers, and/or a peripheral display. Input/output device(s) 620 can include any sort of input devices known in the art. For example, input/output device(s) 620 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 622 can store one or more sets of instructions, such as software or firmware, that embodies any one or more of the methodologies or functions described herein. The instructions can also reside, completely or at least partially, within the memory 604, processor(s) 602, and/or communication interface(s) 618 during execution thereof by the security appliance. The memory 604 and the processor(s) 602 also can constitute machine readable media 622.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example examples.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A computer-implemented method comprising:
   receiving an executable file from a network;
   obtaining content from the executable file;
   generating, based at least in part on the content and using a first machine learning model, a variant of the executable file including an altered content; and
   determining, based at least in part on inputting the variant of the executable file to a second machine learning model, a confidence level that the executable file is associated with a malware; and
   in response to the confidence level, performing a dispositive operation with respect to the executable file.

2. The computer-implemented method of claim 1, wherein the dispositive operation includes at least one of:
   quarantining a computing device that originates the executable file,
   operating an anti-malware software to inspect files stored on the computing device, or
   deleting one or more files containing the malware from the computing device.

3. The computer-implemented method of claim 1, wherein the second machine learning model includes a classifier trained to classify an input to a category of malware.

4. The computer-implemented method of claim 1, wherein
   the first machine learning model includes a diffusion model, and the computer-implemented method further comprises:
   operating the diffusion model to perform a reverse process to remove one or more items from the content to obtain the altered content.

5. The computer-implemented method of claim 4, wherein the content includes programming codes and the one or more items include at least one of an annotation, a parameter, a function, or a command of the programming codes.

6. The computer-implemented method of claim 5, further comprising:
   representing the content of the executable file as a first set of data in a first feature space;
   encoding the first set of data to a second set of data in a second feature space, wherein a dimension of the second feature space is lower than a dimension of the first feature space;
   inputting the second set of data to the diffusion model; and
   operating the diffusion model to generate the altered content of the executable file based at least in part on the second set of data.

7. The computer-implemented method of claim 6, further comprising:
   decoding the altered content to a third set of data in the first feature space;
   inputting the third set of data to the second machine learning model; and
   operating the second machine learning model to generate the confidence level that the executable file is associated with the malware based at least in part on the third set of data.

8. A computer-implemented method comprising:
   obtaining an executable file from a network, the executable file being associated with a malware;
   retrieving content from the executable file;
   generating, based at least in part on the content and using a diffusion model, a variant of the executable file including an altered content;
   determining, based at least in part on inputting the variant of the executable file to a malware detecting model, a confidence level that the variant of the executable file is associated with the malware;
   in response to the confidence level is less than a threshold, generating an adversarial sample of the executable file based at least in part on the altered content, and saving the adversarial sample in a datastore connected to the network; and
   in response to the confidence level is equal to or greater than the threshold, iteratively performing actions, including updating the diffusion model according to the confidence level, until the confidence level is less than the threshold.

9. The computer-implemented method of claim 8, wherein the actions further include:
   generating, using the updated diffusion model, a second variant of the executable file including a second altered content, and re-generating, using the malware detecting model, the confidence level based at least in part on the second variant of the executable file.

10. The computer-implemented method of claim 8, further comprising:
operating the diffusion model to perform a forward process and a reverse process to generate the variant of the executable file without breaking functionality of the executable file.

11. The computer-implemented method of claim 10, wherein
the forward process is configured to add one or more first items to the content of the executable file, and
the reverse process is configured to delete one or more second items from the content of the executable file.

12. The computer-implemented method of claim 11, wherein the content includes programming codes and the one or more first items or the one or more second items include at least one of an annotation, a parameter, a function, or a command of the programming codes.

13. The computer-implemented method of claim 8, further comprising:
including the adversarial sample to a training data set; and
training the malware detecting model using the training data set.

14. A system comprising:
a processor,
a network interface, and
a memory storing instructions executed by the processor to perform actions including:
receiving an executable file from a network;
obtaining content from the executable file;
generating, based at least in part on the content and using a first machine learning model, a variant of the executable file including an altered content; and
determining, based at least in part on inputting the variant of the executable file to a second machine learning model, a confidence level that the executable file is associated with a malware; and
in response to the confidence level, performing a dispositive operation with respect to the executable file.

15. The system of claim 14, wherein the
dispositive operation includes at least one of:
quarantining a computing device that originates the file,
operating an anti-malware software to inspect files stored on the computing device, or
deleting one or more files containing the malware from the computing device.

16. The system of claim 14, wherein the second machine learning model includes a classifier trained to classify an input to a category of malware.

17. The system of claim 14, wherein the first machine learning model includes a diffusion model, and the computer-implemented method further comprises:
operating the diffusion model to perform a reverse process to remove one or more items from the content to obtain the altered content.

18. The system of claim 17, wherein the content includes programming codes and the one or more items include an annotation, a parameter, a function, or a command of the programming codes.

19. The system of claim 18, wherein the actions further comprise:
representing the content of the executable file as a first set of data in a first feature space;
encoding the first set of data to a second set of data in a second feature space, wherein a dimension of the second feature space is lower than a dimension of the first feature space;
inputting the second set of data to the diffusion model; and
operating the diffusion model to generate the altered content of the executable file based at least in part on the second set of data.

20. The system of claim 19, wherein the actions further comprise:
decoding the altered content to a third set of data in the first feature space;
inputting the third set of data to the second machine learning model; and
operating the second machine learning model to generate the confidence level that the executable file is associated with the malware based at least in part on the third set of data.

* * * * *